United States Patent
Maiman et al.

(10) Patent No.: US 12,418,416 B2
(45) Date of Patent: Sep. 16, 2025

(54) FACILITATING AUTHENTICATION USING STOCHASTIC-MODEL-DERIVED IMAGES

(71) Applicant: Capital One Services, LLC, McLean, VA (US)

(72) Inventors: Tyler Maiman, Melville, NY (US); Erik Neighbour, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 132 days.

(21) Appl. No.: 18/506,938

(22) Filed: Nov. 10, 2023

(65) Prior Publication Data

US 2025/0158823 A1 May 15, 2025

(51) Int. Cl.
| | |
|---|---|
| *H04L 9/32* | (2006.01) |
| *G06F 21/36* | (2013.01) |
| *G06N 3/047* | (2023.01) |
| *G06T 11/00* | (2006.01) |
| *H04L 9/40* | (2022.01) |
| *G06N 7/01* | (2023.01) |

(52) U.S. Cl.
CPC .......... *H04L 9/3213* (2013.01); *G06F 21/36* (2013.01); *G06N 3/047* (2023.01); *G06T 11/00* (2013.01); *H04L 63/0807* (2013.01); *G06N 7/01* (2023.01)

(58) Field of Classification Search
CPC ... H04L 9/3213; H04L 63/0807; H04L 63/08; G06T 11/00; G06F 21/36; G06N 3/047; G06N 7/01
See application file for complete search history.

(56) References Cited

U.S. PATENT DOCUMENTS

| | | | | |
|---|---|---|---|---|
| 5,734,752 | A | * | 3/1998 | Knox ................ H04N 1/32352 380/54 |
| 9,183,554 | B1 | * | 11/2015 | Courtright ............. G06T 11/60 |
| 9,311,472 | B2 | * | 4/2016 | Nguyen .................. G06F 21/36 |
| 9,928,358 | B2 | * | 3/2018 | Ghosh .................... G06Q 20/40 |
| 10,432,602 | B2 | * | 10/2019 | An .......................... H04L 63/08 |
| 10,558,879 | B2 | * | 2/2020 | Pollard ............. H04N 1/32256 |
| 10,614,207 | B1 | * | 4/2020 | Truong .................. G06N 3/088 |
| 10,754,814 | B1 | * | 8/2020 | Li ........................... G06F 15/16 |
| 2002/0102007 | A1 | * | 8/2002 | Wang ................. H04N 1/32309 358/1.9 |
| 2015/0302571 | A1 | * | 10/2015 | Lambert ............... H04L 9/3228 382/115 |
| 2017/0064555 | A1 | * | 3/2017 | Johansson ............ H04L 63/107 |

(Continued)

*Primary Examiner* — Hadi S Armouche
(74) *Attorney, Agent, or Firm* — Foley & Lardner LLP

(57) ABSTRACT

Methods and systems are described herein for facilitating token use authentication using stochastic-model-derived images. The system may detect an authentication request to authenticate use of an access token and retrieve operation data associated with the access token. The system may determine, based on the operation data, source data associated with a source of a network operation and alternative source data associated with an alternative source. The system may provide, to a stochastic machine learning model, the source data to obtain a first image for the network operation and the alternative source data to obtain a second image for the network operation. The system may then generate, for display, the first image and the second image and may receive a selection of the first image. Based on the selection of the first image, the system may grant the authentication request.

20 Claims, 7 Drawing Sheets

(56) References Cited

U.S. PATENT DOCUMENTS

| | | | | |
|---|---|---|---|---|
| 2017/0317993 | A1* | 11/2017 | Weber | H04L 63/08 |
| 2018/0374130 | A1* | 12/2018 | Salem | G06Q 30/0609 |
| 2020/0097645 | A1* | 3/2020 | Tokie | G06F 21/45 |
| 2020/0410082 | A1* | 12/2020 | Sharieh | G06F 16/54 |
| 2021/0056562 | A1* | 2/2021 | Hart | G06F 16/27 |
| 2021/0097277 | A1* | 4/2021 | Hirai | G06N 3/08 |
| 2021/0200483 | A1* | 7/2021 | Minakawa | G06F 3/1236 |
| 2021/0279790 | A1* | 9/2021 | Banipal | G06Q 30/0185 |
| 2023/0135488 | A1* | 5/2023 | Kumar | G06Q 20/40145 705/64 |
| 2023/0153284 | A1* | 5/2023 | Walters | G06F 16/24578 707/741 |
| 2023/0385004 | A1* | 11/2023 | Yamada | G06F 3/1222 |
| 2024/0114022 | A1* | 4/2024 | Siddiqui | G06F 21/35 |
| 2024/0267237 | A1* | 8/2024 | Rapowitz | H04L 63/08 |
| 2025/0150479 | A1* | 5/2025 | Tessler | H04L 63/1416 |

\* cited by examiner

200

| Operation | Time | Location | Source |
|---|---|---|---|
| <operation_1> | <value_1a> | <value_1b> | <value_1c> |
| <operation_2> | <value_2a> | <value_2b> | <value_2c> |
| <operation_3> | <value_3a> | <value_3b> | <value_3c> |
| <operation_4> | <value_4a> | <value_4b> | <value_4c> |
| <operation_5> | <value_5a> | <value_5b> | <value_5c> |

203 — Operation
206 — Time
209 — Location
212 — Source

| Input | Parameter A | Parameter B | Parameter C | Parameter D |
|---|---|---|---|---|
| <input_1> | <value_1A> | <value_1B> | <value_1C> | <value_1D> |
| <input_2> | <value_2A> | <value_2B> | <value_2C> | <value_2D> |

303 — Input
306 — Parameter A
309 — Parameter B
312 — Parameter C
315 — Parameter D

| Operation | First Image | Second Image | Third Image | Fourth Image |
|---|---|---|---|---|
| <operation_1> | <image_1> | <image_2> | <image_3> | <image_4> |

503 — Operation
506 — First Image
509 — Second Image
512 — Third Image
515 — Fourth Image

FIG. 5

FACILITATING AUTHENTICATION USING STOCHASTIC-MODEL-DERIVED IMAGES

BACKGROUND

In recent years, users have been able to access accounts from exponentially more devices and in exponentially more locations. However, as users are able to access accounts on these devices and from these locations, there is a need to ensure that users access only the accounts that they are authorized to access. Preexisting systems require users to remember passwords and pin codes. Additionally, these passwords and pin codes may be learned or guessed by unauthorized users, resulting in those unauthorized users being able to access the accounts of a user. For example, bots or other malicious actors may be able to use machine learning models to learn or guess static security details, such as passwords or pin codes.

SUMMARY

Methods and systems are described herein for facilitating authentication using stochastic-model-derived images. In particular, the methods and systems facilitate secure authentication of users using images generated based on details of a user's account with which the user is familiar. By doing so, the methods and systems provide secure authentication without requiring users to remember passwords and pin codes as well as ensure that unauthorized users are not able to access the account of a user if the unauthorized users learn the authorized user's passwords and pin codes. However, the use of images that belong to the user may create storage and privacy concerns. For example, in order to use images that belong to the user, the system must store those images, which increases the amount of data that the system must devote to storage. As the resolution of images exponentially increases, the amount of data that must be stored for a single image increases as well. Additionally, the images that belong to the user may be personal, which may also raise privacy concerns.

To solve these technical problems, the methods and systems recite the use of stochastic models to generate images based on details of a user's account. The stochastic images may then be presented along with other images to users attempting to become authenticated. The patterns of stochastic machine learning models are more difficult to predict than the patterns of non-stochastic machine learning models. The use of stochastic models therefore makes it more difficult for malicious actors to predict which images are stochastic and thus which images to select during an authentication challenge. An authentication system may be built and configured to perform operations discussed herein. For example, the authentication system may detect a request to authenticate access to an account. The request may include an identifier associated with the account. Using the account identifier, the authentication system may retrieve operation data associated with the account. The operation data may include records of account access that has been granted or declined, including details of each occurrence of granted or declined access. Based on the operation data, the authentication system may determine a source associated with an operation included in the operation data. For example, the authentication system may determine a source associated with an occurrence of granted or denied access associated with the account. The authentication system may retrieve source data associated with the identified source. In some embodiments, the authentication system may additionally determine, based on the operation data, an alternative source different from the source. In some embodiments, the authentication system may retrieve alternative source data associated with the identified alternative source.

The authentication system may obtain, via a stochastic machine learning model, a first stochastic image based on the source data or a second stochastic image based on the alternative source data. The first and second stochastic images may respectively represent, illustrate, or otherwise relate to the source and alternative source. For example, the first image may be illustrative of a source with which the user recently transacted, and the second image may be an alternative source with which the user did not recently transact. As the authentication system creates stochastic images, the authentication system does not need to store the generated images (e.g., relieving the storage burden that those images create), which also ensures that the user's privacy is not violated through the storage of images containing sensitive account data. Furthermore, as the stochastic images are generated based on details of the user's account, the user is able to identify the correct authentication images. The authentication system may display the first and second stochastic images to a user, along with instructions to select an image associated with the source of the operation. The user, who is familiar with the account, may recognize that the first stochastic image is associated with the source (e.g., the location at which the user recently transacted). If the user selects the first stochastic image, the authentication system may grant the authentication request. If the user selects the second stochastic image, the authentication system may decline the authentication request. After granting or declining the authentication request, the authentication system no longer needs to store the first and second stochastic images and can delete them—saving data storage space and alleviating any privacy concerns. Notably, the stochastic machine learning model may require substantially less space for storage than the first and second stochastic images. Accordingly, the methods and systems overcome the aforementioned technical problems as well as provide an improved mechanism for authenticating users beyond those of preexisting systems.

In some aspects, the authentication system may detect an authentication request to authenticate access to an account. The authentication request may include an account identifier associated with the account. In some embodiments, the request may include information about the use of the account. In some embodiments, the authentication request may originate from a particular source, and the authentication request may include data about the source. The authentication system may retrieve operation data associated with the account. For example, the authentication system may retrieve the operation data using the account identifier. The operation data may include records of account access granted or declined, including details of each occurrence of granted or declined access. For example, the operation data may include a log of previous authentication requests, sources associated with the previous authentication requests, data associated with the previous authentication requests, and information about each request being granted or declined.

The authentication system may determine, based on the operation data, source data associated with a source of a network operation associated with the account and alternative source data associated with an alternative source. For example, based on the operation data, the authentication system may determine a source associated with an operation included in the operation data. The authentication system may determine a source associated with an occurrence of granted or denied access associated with the account. The source may be a browser, a device, an application programming interface (API) client, or other source. The authentication system may retrieve source data associated with the identified source. In some embodiments, the authentication system may determine, based on the operation data, an alternative source different from the source. In some embodiments, the alternative source may be associated with a variation of the source, the alternative source may be related to the source, or the alternative source may be otherwise associated with the source. For example, the alternative source may be a related browser, a related device, a related API client, or another related source. In some embodiments, the alternative source may be unrelated to the source. In some embodiments, the alternative source may be related to a different operation from the operation data.

The authentication system may obtain, via a stochastic machine learning model, (i) a first image based on the source data and (ii) a second image based on the alternative source data. In some embodiments, using source data associated with the source and alternative source associated with the alternative source, the authentication system may generate first and second image generation parameters, respectively. For example, the image generation parameters may include the source data and alternative source data, constraints for the generated images, or other parameters. In some embodiments, the authentication system may provide the first and second image generation parameters to the stochastic machine learning model to cause the stochastic machine learning model to generate the first and second stochastic images, respectively. The first and second stochastic images may respectively represent, illustrate, or otherwise relate to the source and alternative source.

The authentication system may generate, for display, an image set including the first image and the second image. For example, the authentication system may display the first and second stochastic images to a user, along with instructions to select an image associated with the source of the operation. In some embodiments, the authentication system may receive a selection of the first image from the image set and may grant the authentication request based on the selection of the first image. In some embodiments, the authentication system may receive a selection of the second image from the image set and may decline the authentication request based on the selection of the second image.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates a data structure storing operation data, in accordance with one or more embodiments.

FIG. 3 illustrates a data structure storing image generation parameters, in accordance with one or more embodiments.

FIG. 5 illustrates a data structure storing images, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
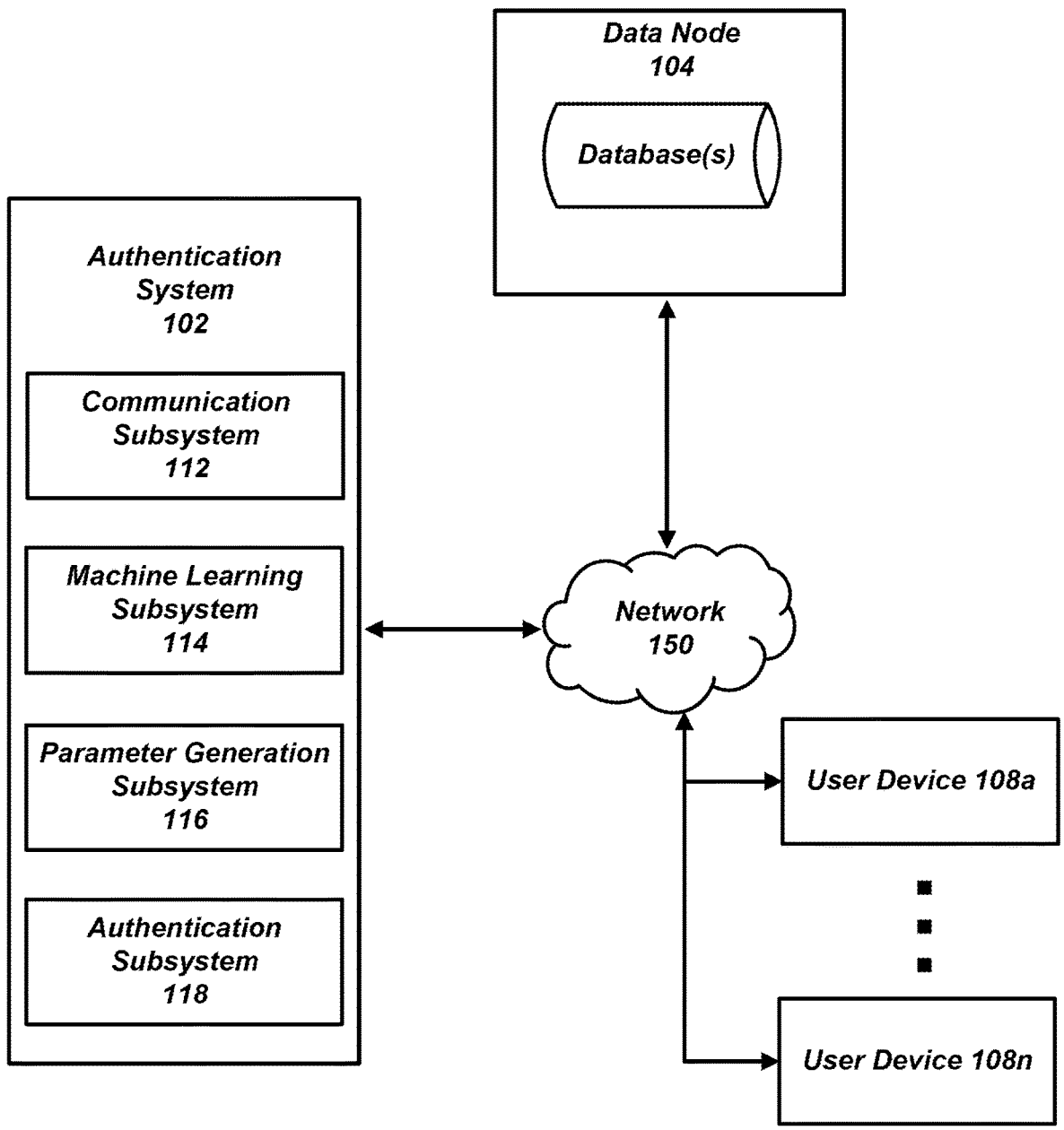
FIG. 1 shows an illustrative system for facilitating authentication using stochastic-model-derived images, in accordance with one or more embodiments.

FIG. 1 shows an illustrative system 100 for facilitating authentication using stochastic-model-derived images, in accordance with one or more embodiments. System 100 may include authentication system 102, data node 104, and user devices 108a-108n. Authentication system 102 may include communication subsystem 112, machine learning subsystem 114, parameter generation subsystem 116, authentication subsystem 118, and/or other subsystems. In some embodiments, only one user device may be used, while in other embodiments, multiple user devices may be used. The user devices 108a-108n may be associated with one or more users. The user devices 108a-108n may be associated with one or more user accounts. In some embodiments, user devices 108a-108n may be computing devices that may receive and send data via network 150. User devices 108a-108n may be end-user computing devices (e.g., desktop computers, laptops, electronic tablets, smartphones, and/or other computing devices used by end users). User devices 108a-108n may output (e.g., via a graphical user interface) run applications, output communications, receive inputs, or perform other actions.

Authentication system 102 may execute instructions for generating images based on generated clusters of historic events. Authentication system 102 may include software, hardware, or a combination of the two. For example, communication subsystem 112 may include a network card (e.g., a wireless network card and/or a wired network card) that is associated with software to drive the card. In some embodiments, authentication system 102 may be a physical server or a virtual server that is running on a physical computer system. In some embodiments, authentication system 102 may be configured on a user device (e.g., a laptop computer, a smart phone, a desktop computer, an electronic tablet, or another suitable user device).

Data node 104 may store various data, including one or more machine learning models, training data, communications, and/or other suitable data. In some embodiments, data node 104 may also be used to train machine learning models. Data node 104 may include software, hardware, or a combination of the two. For example, data node 104 may be a physical server or a virtual server that is running on a physical computer system. In some embodiments, authentication system 102 and data node 104 may reside on the same hardware and/or the same virtual server/computing device. Network 150 may be a local area network, a wide area network (e.g., the internet), or a combination of the two.

Authentication system 102 may detect a request to authenticate access, such as access to an account or use of a token. The request may include an identifier associated with the account or token. Using the identifier, authentication system 102 may retrieve operation data associated with the account or token. Based on the operation data, authentication system 102 may determine a source associated with an operation included in the operation data and an alternative source different from the source. Authentication system 102 may obtain images via a stochastic machine learning model based on the source and the alternative source. Authentication system 102 may then display the images to a user, along with instructions to select an image associated with the source of the operation. Authentication system 102 may generate an authentication response based on the image selected by the user.

Authentication system 102 (e.g., communication subsystem 112) may detect an authentication request to authenticate access to an account. In some embodiments, the account may be associated with a user device, a social media account corresponding to the user, an application corresponding to the user, a cloud-based memory corresponding to the user, an online resource corresponding to the user, or another device or service. The authentication request may include an account identifier associated with the account. For example, the account identifier may include an account number, a username, an email address, a phone number, a social security number, a customer identifier, a client identifier, a transaction identifier, a patient identifier, a member identifier, or another type of account identifier. In some embodiments, the request may include information about the use of the account. For example, the use of the account may relate to retrieving account information, updating account information, accessing account resources, or performing other actions. In some embodiments, the authentication request may originate from a particular source, and the authentication request may include data about the source.

In some embodiments, the request to access the account may include a request to authenticate use of a network access token. A network access token may be a security credential used to authenticate and authorize access to network resources or services. In some embodiments, the network access token may be affiliated with, received by, sent by, or otherwise associated with the account. The token may be issued to an application or user by authentication system 102. The access token may serve as proof of a user's identity and permissions, allowing the user to access protected resources or perform specific actions within a network or service. The access token may be encrypted or digitally signed to ensure integrity and prevent tampering. In some embodiments, the authentication request may include information about the use of the token. For example, the authentication request may include details about the network resources or services that will be accessed if the token use is authenticated. The authentication request may include a token identifier associated with the access token. The token identifier may be a unique identifier associated with the token. The token identifier may distinguish and reference a particular access token within a system. In some embodiments, the access token may be represented as strings of characters. In some embodiments, the authentication request may originate from a particular source, and the authentication request may include data about the source.

In response to detecting the authentication request, communication subsystem 112 may retrieve operation data. In some embodiments, communication subsystem 112 may retrieve operation data associated with the account using the account identifier. In some embodiments, communication subsystem 112 may retrieve operation data associated with the token using the token identifier. The operation data may include records of access granted or declined, including details of each occurrence of granted or declined access. For example, the operation data may include a log of previous authentication requests, sources associated with the previous authentication requests, data associated with the previous authentication requests, and information about each request being granted or declined. Based on the operation data, authentication system 102 may determine sources based on the operation data and may obtain, via a stochastic machine learning model, images based on the sources. Authentication system 102 may then display the images to a user, along with instructions to select an image associated with the source of the operation. Authentication system 102 may generate an authentication response based on the image selected by the user.

FIG. 2 illustrates a data structure 200 storing operation data, in accordance with one or more embodiments. In some embodiments, data structure 200 may be a subset of a larger data structure. Data structure 200 may include operations 203 and data relating to operations 203. For example, the data may include a time 206, a location 209, a source 212, or other information for each operation. In some embodiments, data structure 200 may include operations 203 that have been performed using the network access token. In some embodiments, data structure 200 may include operations 203 that have been performed by authentication system 102 using multiple tokens including the network access token. In some embodiments, operations 203 may include records of granted access, declined access, or both granted and declined access. In some embodiments, operations 203 may include transactions performed in association with an account. For example, operations 203 may include transactions performed by using the token as a payment method or payment account. In some embodiments, operations 203 may include other types of authentication operations.

Communication subsystem 112 may detect a request to authenticate account access. The request may include an identifier (e.g., an account identifier). Using the identifier, communication subsystem 112 may retrieve operation data associated with the account. In some embodiments, communication subsystem 112 may determine, based on the operation data, a source associated with a network operation that is associated with the account or token. For example, communication subsystem 112 may determine a source associated with an occurrence of granted or denied access. Communication subsystem 112 may determine, for a particular operation (e.g., of operations 203, as shown in FIG. 2), a source of the operation (e.g., a source that attempted to access the account or perform an action with the token). The source may be a browser, a device, an API client, or other source. The source may be identified based on an identifier (e.g., an IP address, a user identifier, an application identifier, a digital certificate, or other identifier) stored in a database (e.g., data structure 200) or elsewhere. In some embodiments, communication subsystem 112 may request, from the source, an identifier or other data associated with the source. Authentication system 102 may retrieve source data associated with the identified source using the source identifier. The source data may include location information, authentication information, operation history, or other data associated with the source. For example, the source may be a retailer at which the user recently transacted, and the source data may include data associated with the retailer.

In some embodiments, communication subsystem 112 may determine, based on the operation data, an alternative source associated with the token. For example, the alternative source may be different from the source. The alternative source may be identified based on an identifier (e.g., an IP address, a user identifier, an application identifier, a digital certificate, or other identifier) stored in a database (e.g., data structure 200) or elsewhere. In some embodiments, communication subsystem 112 may request, from the alternative source, an identifier or other data associated with the alternative source. In some embodiments, communication subsystem 112 may determine, based on the operation data, alternative source data associated with an alternative source. Communication subsystem 112 may retrieve alternative source data associated with the alternative source using an alternative source identifier. The alternative source data may include location information, authentication information, operation history, or other data associated with the alternative source. For example, the source may be a different retailer at which the user did not recently transact, and the alternative source data may include data associated with the different retailer.

In some embodiments, the alternative source may be associated with a variation of the source, the alternative source may be related to the source, or the alternative source may be otherwise associated with the source. For example, the alternative source may be a related browser, a related device, a related API client, or another related source. For example, the alternative source may be a different location of the same retailer (e.g., a different store location) as the source. In some embodiments, the alternative source may be unrelated to the source. For example, the alternative source may be a different browser, a different device, a different API client, or another different source. For example, the alternative source may be a different retailer entirely. In some embodiments, the alternative source may be related to a different operation, from the operation data, than the operation related to the source. For example, the alternative source may be a source of the different operation from the operation data. As an example, the alternative source may be a retailer at which the user has transacted in the past, though not recently (e.g., not within a certain time frame, such as the past month). In some embodiments, the alternative source may be a source that is unrelated to the operation data.

In some embodiments, the source may differ from the alternative source according to one or more of a time, a location, or a weather characteristic. For example, a time associated with the source (e.g., a timestamp, time of day, time of year, time zone, system time, or other measurement of time) may differ from a time associated with the alternative source. In some embodiments, the source and the alternative source may otherwise be the same or similar. As an example, the source may be a content delivery network (CDN) server that provided content for the particular network operation. CDN servers may be used to distribute website content across multiple servers located in various geographic regions. Since CDNs have multiple servers spread across different locations, the content served by a particular server can depend on various factors, including the content's caching status. As a result, a user accessing a website at different times of the day may receive content at different speeds. Thus, the alternative source may be the same CDN server as the source but may operate differently based on when it is accessed. In some embodiments, the source may be a physical location at which the particular network operation was performed, and the network operation may have been performed at a particular time of day (e.g., morning). The alternative source may be the same physical location at a different time of day (e.g., nighttime).

In some embodiments, the source may be associated with a location (e.g., physical location, geographic location, file system location, network location, memory location, or other location), and the alternative source may be associated with a different location. The source and the alternative source may otherwise be the same or similar. As an example, the source may be a CDN server that provided content for the particular network operation. CDNs aim to reduce the latency and improve the performance of websites by delivering content from servers that are closer to the users. These servers may be placed in data centers worldwide to ensure efficient content delivery. The alternative source may be a different CDN server responsible for providing similar content at another location in the world. In some embodiments, the source may be a physical location (e.g., a business) at which the particular network operation was performed and the alternative source may be a different physical location (e.g., of the same business chain).

In some embodiments, the source may be associated with a weather characteristic (e.g., current weather conditions, weather forecasts, weather alerts, historic weather data, weather analysis, or other weather characteristic) and the alternative source may be associated with a different weather characteristic. The source and the alternative source may otherwise be the same or similar. As an example, severe weather events, such as hurricanes, floods, or snowstorms, can impact the operations of data centers as well as the demand on certain servers (e.g., CDN servers). In extreme cases, data centers may experience power outages, connectivity issues, or even physical damage, affecting their ability to serve content to users. As such, the source may be a CDN server that provided content for the particular network operation and the alternative source may be the same CDN server operating differently due to weather conditions. In some embodiments, the source may be a physical location at which the particular network operation was performed, and the network operation may have been performed during particular weather (e.g., on a sunny day). The alternative source may be the same physical location with different weather (e.g., on a cloudy, rainy day). In some embodiments, the source may differ from the alternative source according to characteristics.

As previously discussed, communication subsystem 112 may detect a request to authenticate access to an account and may retrieve operation data associated with the account. Based on the operation data, communication subsystem 112 may determine a source associated with an operation included in the operation data associated with the account and an alternative source different from the source. In some embodiments, authentication system 102 may obtain images via a stochastic machine learning model based on the source and the alternative source. For example, authentication system 102 (e.g., machine learning subsystem 114) may obtain, via one or more stochastic machine learning models, one or more stochastic images. The stochastic machine learning model may be trained to generate stochastic images based on inputs. For example, machine learning subsystem 114 may obtain, via one or more stochastic machine learning models, (i) a first image based on the source data and (ii) a second image based on the alternative source data. In some embodiments, machine learning subsystem 114 may provide one or more inputs to the stochastic machine learning models to obtain the stochastic images. Communication subsystem 112 may then display an image set to a user, along with instructions to select an image associated with the source of the operation. Authentication subsystem 118 may generate an authentication response based on the image selected by the user.

Machine learning subsystem 114 may provide data to a stochastic machine learning model to obtain the stochastic images. For example, machine learning subsystem 114 may provide, to the stochastic machine learning model, the source data and the alternative source data. The inputs (e.g., source data or alternative source data) may be used to generate input vectors, which may be encoded into a latent space representation of the stochastic machine learning model. Providing the source data to the stochastic machine learning model may cause the stochastic machine learning model to output a first image, and providing the alternative source data to the stochastic machine learning model may cause the stochastic machine learning model to output a second image. For example, the stochastic machine learning model may decode the latent representation back into an image output. This process may involve passing the encoded input through the decoder portion of a generative model (e.g., a generative adversarial network (GAN)), which may be a part of the stochastic machine learning model. Since stochastic models incorporate randomness, multiple stochastic images may be generated from the same encoded input (e.g., the same source or the same alternative source). As an example, machine learning subsystem 114 may receive, from the stochastic machine learning model, a stochastic image based on the source data and multiple stochastic images based on the alternative source data.

In some embodiments, authentication system 102 (e.g., parameter generation subsystem 116) may generate image generation parameters for input to a stochastic machine learning model. For example, parameter generation subsystem 116 may generate first image generation parameters using the source data associated with the source and second image generation parameters using the alternative source data associated with the alternative source. In some embodiments, image generation parameters may include one or more variables. For example, image generation parameters may include conditioning variables, which may be provided as input to guide the generation process. For example, the stochastic machine learning model may be conditioned on class labels or other attributes to generate images that match specific characteristics. In some embodiments, image generation parameters may include interpolation parameters, which may allow for interpolation between different latent vectors or input parameters to generate variations of stochastic images. Interpolation parameters may control blending or mixing between different latent vectors, resulting in a smooth transition between generated stochastic images. In some embodiments, image generation parameters may include temperature parameter, which may control a level of randomness during image generation. For example, higher temperature values may introduce more diversity and randomness in the generated images, while lower values may make the images output by the model more deterministic. In some embodiments, parameter generation subsystem 116 may generate values for first image generation parameters (e.g., the parameter types listed herein or other parameter types) based on the source data and values for second image generation parameters (e.g., the parameter types listed herein or other parameter types) based on the alternative source data.

In some embodiments, the image generation parameters may include one or more constraints. For example, the first image generation parameters may include one or more first constraints for the first image, and the second image generation parameters may include one or more second constraints for the second image. The one or more constraints may guide the generation process and increase a likelihood of desired properties in the generated outputs. The one or more constraints may include bounds or limits to control the range or limits of certain variables or attributes in the generated outputs. For example, in image generation, constraints may be set on pixel intensity values or color channels to ensure generated stochastic images remain within specific bounds. The one or more constraints may include structural constraints, which may define a desired structure or composition of the generated outputs. Structural constraints may be related to the arrangement, layout, or relationships between different elements. The one or more constraints may include semantic constraints, which may ensure that the generated outputs adhere to specific semantic properties or meanings. These constraints can be based on domain-specific rules or requirements. In some embodiments, constraints may include style constraints, which may aim to capture and reproduce specific stylistic elements or characteristics in the generated outputs. For instance, in generating images, style constraints can be applied to mimic a particular artistic style, color palette, or visual theme. The one or more constraints may include user-defined constraints, which may allow users to define their own constraints based on specific requirements. These constraints can reflect personal preferences, guidelines, or specific objectives that the generated outputs should satisfy. In some embodiments, the constraints may include other types of constraints. In some embodiments, the constraints may be incorporated through loss functions, regularization techniques, optimization objectives, specific architectural choices, or other means.

In some embodiments, the parameter generation subsystem 116 may determine constraints based on a time associated with the source. For example, parameter generation subsystem 116 may determine, based on the operation data, a time associated with the source and may determine constraints based on the time associated with the source. Parameter generation subsystem 116 may specify certain semantic or stylistic constraints based on a timestamp, time of day, time of year, time zone, system time, or other measurement of time of the source. As discussed above, the source and the alternative source may differ based on time. As such, parameter generation subsystem 116 may generate first constraints based on a time at which the source performed a particular network operation and parameter generation subsystem 116 may generate second constraints based on a time at which the alternative source performed a different network operation or based on another time.

In some embodiments, the parameter generation subsystem 116 may determine constraints based on a location associated with the source. For example, parameter generation subsystem 116 may determine, based on the operation data, a location associated with the source and may determine constraints based on location time associated with the source. Parameter generation subsystem 116 may specify certain semantic or stylistic constraints based on a physical location, geographic location, file system location, network location, memory location, or other location of the source. As discussed above, the source and the alternative source may differ based on location. As such, parameter generation subsystem 116 may generate first constraints based on a location at which the source performed a particular network operation and parameter generation subsystem 116 may generate second constraints based on a different location (e.g., a related location).

In some embodiments, the parameter generation subsystem 116 may determine constraints based on a weather condition associated with the source. For example, parameter generation subsystem 116 may determine, based on the operation data, a weather condition associated with the source and may determine constraints based on the weather condition associated with the source. Parameter generation subsystem 116 may specify certain semantic or stylistic constraints based on current weather conditions, weather forecasts, weather alerts, historic weather data, weather analysis, or other weather characteristic of the source. As discussed above, the source and the alternative source may differ based on weather. As such, parameter generation subsystem 116 may generate first constraints based on a weather condition occurring when the source performed a particular network operation and parameter generation subsystem 116 may generate second constraints based on a different weather condition.

FIG. 3 illustrates a data structure 300 storing image generation parameters, in accordance with one or more embodiments. In some embodiments, data structure 300 may be a subset of a larger data structure. Data structure 300 may include inputs 303. In some embodiments, one or more of inputs 303 may be provided to a stochastic machine learning model, such as a first input based on source data and a second input based on alternative source data. In some embodiments, one or more of inputs 303 may be provided to the stochastic machine learning model one or more times to obtain, from the stochastic machine learning model, one or more stochastic images based on the same input. Data structure 300 may include values for parameter 306, parameter 309, parameter 312, parameter 315, and any other parameters. In some embodiments, parameter 306, parameter 309, parameter 312, and parameter 315 may include the parameter types or constraint types discussed above or other parameter or constraint types.

For example, machine learning subsystem 114 may provide image generation parameters (e.g., such as those shown in FIG. 3) to the stochastic machine learning model. In some embodiments, providing the image generation parameters to the stochastic machine learning model may cause the stochastic machine learning model to generate stochastic images as outputs. For example, machine learning subsystem 114 may provide, to the stochastic machine learning model, (i) the first image generation parameters to obtain a first stochastic image for the network operation and (ii) the second image generation parameters to obtain a second stochastic image for the network operation.

In some embodiments, machine learning subsystem 114 may provide other inputs to the stochastic machine learning model. For example, machine learning subsystem 114 may apply one or more processing techniques to data (e.g., source data, alternative source data, image generation parameters, or other data) before it is input into the stochastic machine learning model. Processing techniques may include generating embeddings based on the data, cleaning the data, transforming the data, scaling the data, encoding the data, performing feature engineering, or performing other processing techniques. In some embodiments, the post-processing data may be input into the stochastic machine learning model. In some embodiments, other data may be input into the stochastic machine learning model (e.g., based on the source data or alternative source data).

Machine learning subsystem 114 may include or manage one or more machine learning models. For example, one or more machine learning models may be trained to generate images based on inputs. Machine learning subsystem 118 may include software components, hardware components, or a combination of both. For example, machine learning subsystem 118 may include software components (e.g., API calls) that access one or more machine learning models. Machine learning subsystem 118 may access training data, for example, in memory. In some embodiments, machine learning subsystem 118 may access the training data on data node 104 or on user devices 108a-108n. In some embodiments, the training data may include entries with corresponding features and corresponding output labels or images for the entries. In some embodiments, machine learning subsystem 118 may access one or more machine learning models. For example, machine learning subsystem 118 may access the machine learning models on data node 104 or on user devices 108a-108n.

In some embodiments, machine learning subsystem 118 may include one or more stochastic machine learning models. A stochastic machine learning model may incorporate randomness or probabilistic elements into its architecture or learning process. Randomness may allow for the modeling of uncertainty and the generation of varied outputs rather than producing deterministic predictions or results. In some embodiments, the stochastic machine learning models may be trained using adversarial techniques. For example, communication subsystem 112 may retrieve a large dataset of real images for model training. The stochastic machine learning model may include a generator network and a discriminator network. The generator network may receive random noise or input vectors as input and attempt to generate realistic images. The discriminator network may be trained to distinguish between real images from the dataset and stochastic images produced by the generator. The generator and discriminator networks may iteratively work against each other, where the generator attempts to generate images that the discriminator cannot classify as either real or synthetic, while the discriminator attempts to accurately classify real and synthetic images. The model's parameters may be updated based on the loss function computed during backpropagation, thus optimizing the generator and discriminator networks.

In some embodiments, machine learning subsystem 114 may utilize the adversarial network to generate the first or second stochastic images. For example, machine learning subsystem 114 may obtain the first image or the second image from a generator of the stochastic machine learning model. For example, the generator of the stochastic machine learning model may generate the first image based on the first image generation parameters or the source data or the generator may generate the second image based on the second image generation parameters or the alternative source data. In some embodiments, obtaining the first image may involve a generator of an adversarial network generating the first image or obtaining the second image may involve a generator of an adversarial network generating the second image. In some embodiments, machine learning subsystem 114 may refrain from outputting an image generated by the generator of the adversarial network unless a classifier is unable to classify the generated image as synthetic (as opposed to real) or until the classifier classifies the generated image as real. In some embodiments, the generator may continue generating iterations of a first stochastic image or a second stochastic image until the classifier classifies the generated image as real (e.g., as opposed to synthetic).

Figure 4:
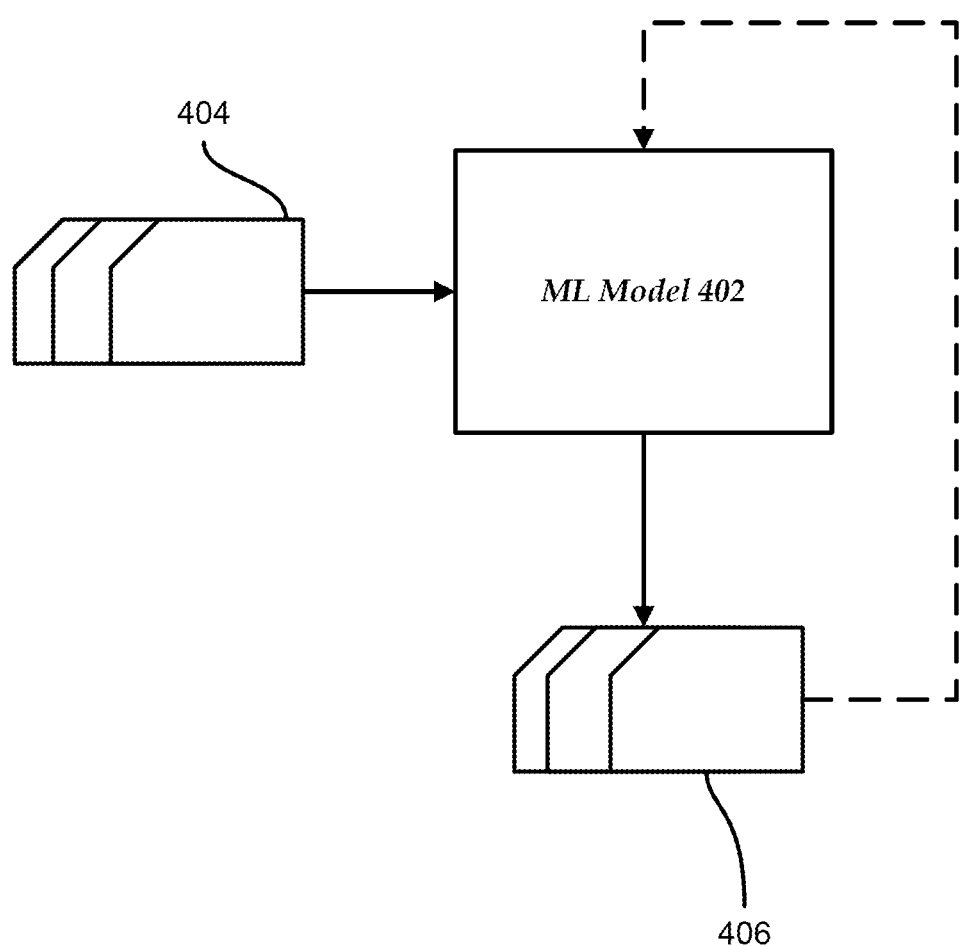
FIG. 4 illustrates an exemplary machine learning model, in accordance with one or more embodiments.

FIG. 4 illustrates an exemplary machine learning model 402, in accordance with one or more embodiments. In some embodiments, machine learning model 402 may be included in machine learning subsystem 118 or may be associated with machine learning subsystem 118. Machine learning model 402 may take input 404 (e.g., source data, alternative source data, image generation parameters, or processed data) and may generate outputs 406 (e.g., stochastic images). The output parameters may be fed back to the machine learning model as inputs to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

FIG. 5 illustrates a data structure 500 storing images, in accordance with one or more embodiments. Data structure 500 may be a subset of a larger data structure. In some embodiments, data structure 500 includes, for an operation 503 associated with the source, a set of images. The image set may include a first image 506, a second image 509, a third image 512, a fourth image 515, or other images. In some embodiments, the image set may include one or more stochastic images generated by the stochastic machine learning model or by another stochastic machine learning model. As an example, the first image 506 may be a stochastic image generated based on the source data or first image generation parameters, and the second image 509, the third image 512, and the fourth image 515 may be stochastic images generated based on the alternative source data or second image generation parameters.

In some embodiments, the image set may include one or more real images (e.g., as opposed to stochastic images). For example, one or more images of the image set may be images retrieved based on data (e.g., source data). As an example, the first image 506 may be a real image (e.g., public images, images retrieved from an external source or database, etc.) retrieved based on the source data, and the second image 509, the third image 512, and the fourth image 515 may be stochastic images generated based on the alternative source data or second image generation parameters. For example, the first image 506 may include a real image of a Starbucks location at which the user recently transacted, and the second image 509, the third image 512, and the fourth image 515 may be stochastic images depicting other Starbucks locations. As an example, the second image 509, the third image 512, and the fourth image 515 may be real images (e.g., public images, images retrieved from an external source or database, etc.) retrieved based on the alternative source data, and the first image 506 may be a stochastic image generated based on the source data or first image generation parameters. For example, the second image 509, the third image 512, and the fourth image 515 may include real images of other Starbucks locations at which the user did not recently transact, and the first image 506 may be a stochastic image depicting the Starbucks location at which the user recently transacted.

In some embodiments, one or more portions of an image may be real (e.g., as opposed to stochastic). For example, an image may include a real image of the source as well as stochastic portions, such as a stochastic background. In some embodiments, one or more portions of an image (e.g., the first image) may include public images, images captured by other users, or other images retrieved by communication subsystem 112. As an example, an image (e.g., the first image) may include an image retrieved from the Internet using source data. For example, the first image may include a real image of a Starbucks location at which the user recently transacted, and one or more portions of the image may be generated using a stochastic machine learning model to reflect a different background, weather, time of day, or other condition. In some embodiments, one or more portions of an image (e.g., the first image) may be enhanced using one or more enhancements or modifications (e.g., discussed in greater detail below). For example, the first image may include a real image of a Starbucks location at which the user recently transacted, and one or more portions of the image may be enhanced using one or more enhancements or modifications (e.g., discussed in greater detail below). In some embodiments, one or more portions of an image may be otherwise modified. In embodiments in which both the first image and the second image include one or more real images, because both images include real and stochastic portions, it will be much more difficult for malicious actors to identify which of the images is the correct image for authentication purposes.

While, in some embodiments, stochastic machine learning models are used to generate or modify the images, other embodiments may use non-stochastic machine learning models to generate or modify the images. In some embodiments, communication subsystem 112 may apply one or more enhancements or modifications to one or more of the images in the image set. For example, communication subsystem 112 may apply one or more filters, effects, lighting or color adjustments, or other enhancements to one or more of the images in the image set. For example, communication subsystem 112 may apply one or more rule-based filters. Rule-based filters for images may include techniques that apply specific rules or criteria to process and manipulate images. These filters may use predefined rules to modify or enhance different aspects of the image, such as color, contrast, brightness, sharpness, and more. Rule-based filters may follow explicit instructions to alter the appearance of an image. In some embodiments, communication subsystem 112 may otherwise modify images in the image set, for example, by cropping, blurring, or otherwise modifying the images.

As previously discussed, communication subsystem 112 may detect a request to authenticate account access. The request may include an identifier (e.g., an account identifier). Using the identifier, communication subsystem 112 may retrieve operation data associated with the account. In some embodiments, communication subsystem 112 may determine, based on the operation data, a source associated with a network operation that is associated with the account and an alternative source different from the source. For example, the source may be a Starbucks location at which the user recently transacted, and the alternative source may be a different Starbucks location at which the user did not recently transact. Authentication system 102 may obtain images via a stochastic machine learning model based on the source or the alternative source. In some embodiments, communication subsystem 112 may generate, for display, an image set including a first image and a second image. In some embodiments, the image set may include additional images, as illustrated by FIG. 5. For example, the first image or the second image may include one or more stochastic images generated by the stochastic machine learning model. As an example, the first image may be a stochastic image generated based on the source data or first image generation parameters or the first image may include portions that were generated by a stochastic machine learning model based on the source data. The second image may be a stochastic image generated based on the alternative source data or second image generation parameters or the second image may include portions that were generated by a stochastic machine learning model based on the alternative source data. As an example, one or more portions of the first image may include a real image (e.g., as opposed to a stochastic image) retrieved based on the source data (e.g., from an external source or database) and the second image may be a stochastic image generated based on the alternative source data or second image generation parameters. For example, the first image may include a real image of the Starbucks location at which the user recently transacted and the second image may be fully generated by the stochastic machine learning model using the alternative source data. For example, the first image may include a real image of the Starbucks location at which the user recently transacted and the second image may include a real image of a different Starbucks location at which the user did not recently transact. Communication subsystem 112 may then display the image set to a user, along with instructions to select an image associated with the source of the operation. Authentication subsystem 118 may generate an authentication response based on the image selected by the user.

In some embodiments, communication subsystem 112 may generate for display (e.g., with the image set) instructions to select an image associated with the source of the network operation. For example, the instructions may include "select an image associated with a social media platform you recently logged into," "select an image for a Google service you accessed in the past week," or another instruction. In some embodiments, the instructions may include "select an image of the Starbucks location where you recently transacted," "select one or more images associated with a business you transacted with in the last week," or another instruction. In some embodiments, the instructions may prompt the user to select an image depicting the same time, location, or weather conditions that existed at the time of the operation. For example, the instructions may include "select an image of a business at which you recently transacted that depicts the time of day of the transaction" or "select an image of the Starbucks location at which you recently transacted that depicts the weather at the time of the transaction." In some embodiments, the instructions may include additional prompts for selecting an image from the image set.

Communication subsystem 112 may receive a user selection of an image from the image set. Based on the user selection, authentication system 102 (e.g., authentication subsystem 118) may generate an authentication response. For example, authentication subsystem 118 may grant the authentication request in response to a first user selection of the first image (e.g., a retrieved image associated with the source or a stochastic image associated with the source). In some embodiments, authentication subsystem 118 may decline the authentication request in response to a second user selection of a stochastic image (e.g., the image associated with the alternative source). For example, authentication subsystem 118 may grant the authentication request if the user selects a first image depicting the Starbucks location at which the user recently transacted and may decline the authentication request if the user selects a second image depicting a different Starbucks location at which the user did not recently transact.

In some embodiments, granting the authentication request may involve authentication subsystem 118 granting the user a session token or access token for the system. This token may serve as proof of authentication and authorization and may be used to access a requested account or resource during the current session. During the authenticated session, authentication subsystem 118 may manage the user's session, including tracking session timeouts, handling session renewals, or ensuring the security of the user's interactions with the system. In some embodiments, authentication subsystem 118 may store a record of the granted access as an operation for future reference (e.g., in data structure 200, as shown in FIG. 2).

In some embodiments, declining the authentication request may involve denying or revoking access to the system or the requested resource. In some embodiments, communication subsystem 112 may display an error message indicating the authentication failure or simply block the user from proceeding. In some embodiments, authentication subsystem 118 may block the user from accessing or attempting to access the account or system again for a certain time period after the instance of declined access. In some embodiments, authentication subsystem 118 may store a record of the declined access as an operation for future reference (e.g., in data structure 200, as shown in FIG. 2).

Computing Environment

Figure 6:
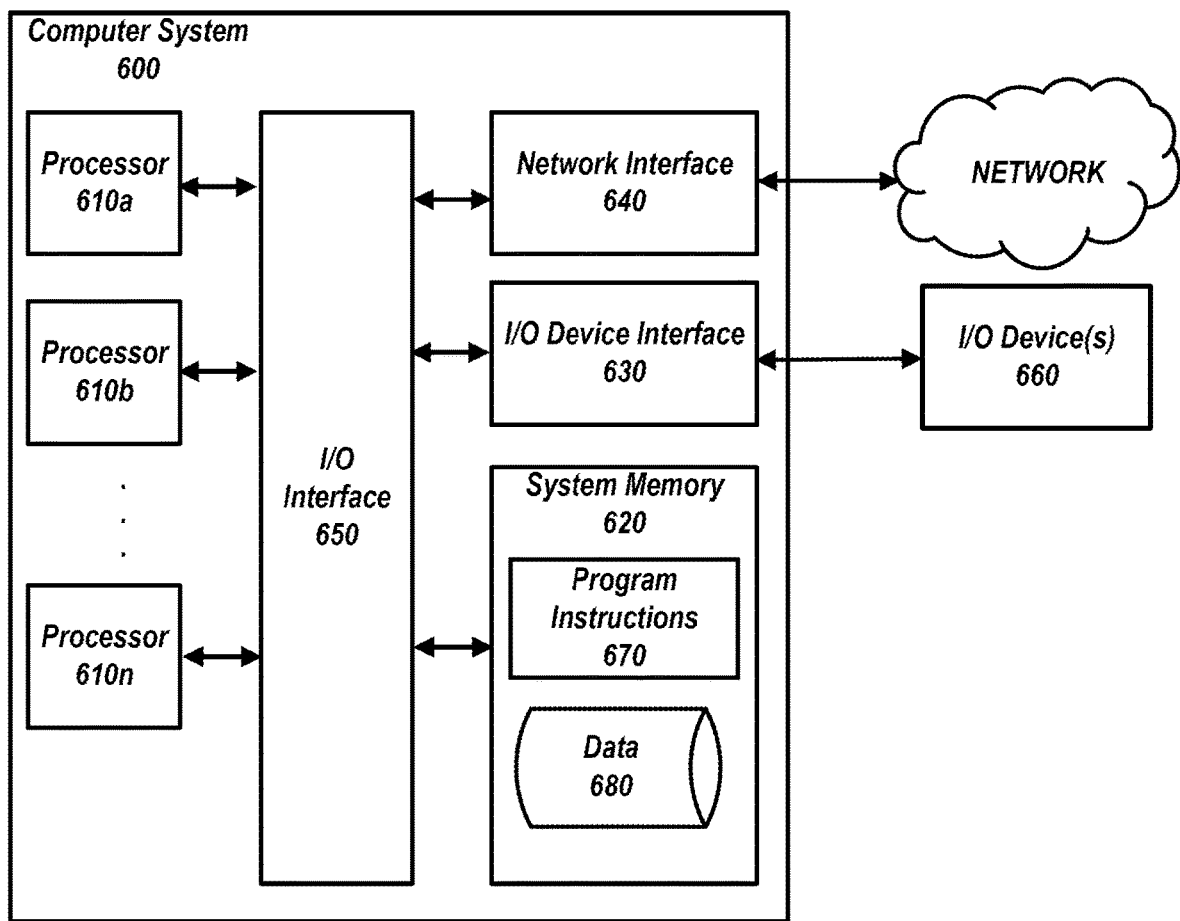
FIG. 6 illustrates a computing device, in accordance with one or more embodiments.

FIG. 6 shows an example computing system 600 that may be used in accordance with some embodiments of this disclosure. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a user device, a mobile telephone, a personal digital assistant (PDA), a mobile audio or video player, a game console, a vehicle-mounted computer, a Global Positioning System (GPS), or the like. Computing system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
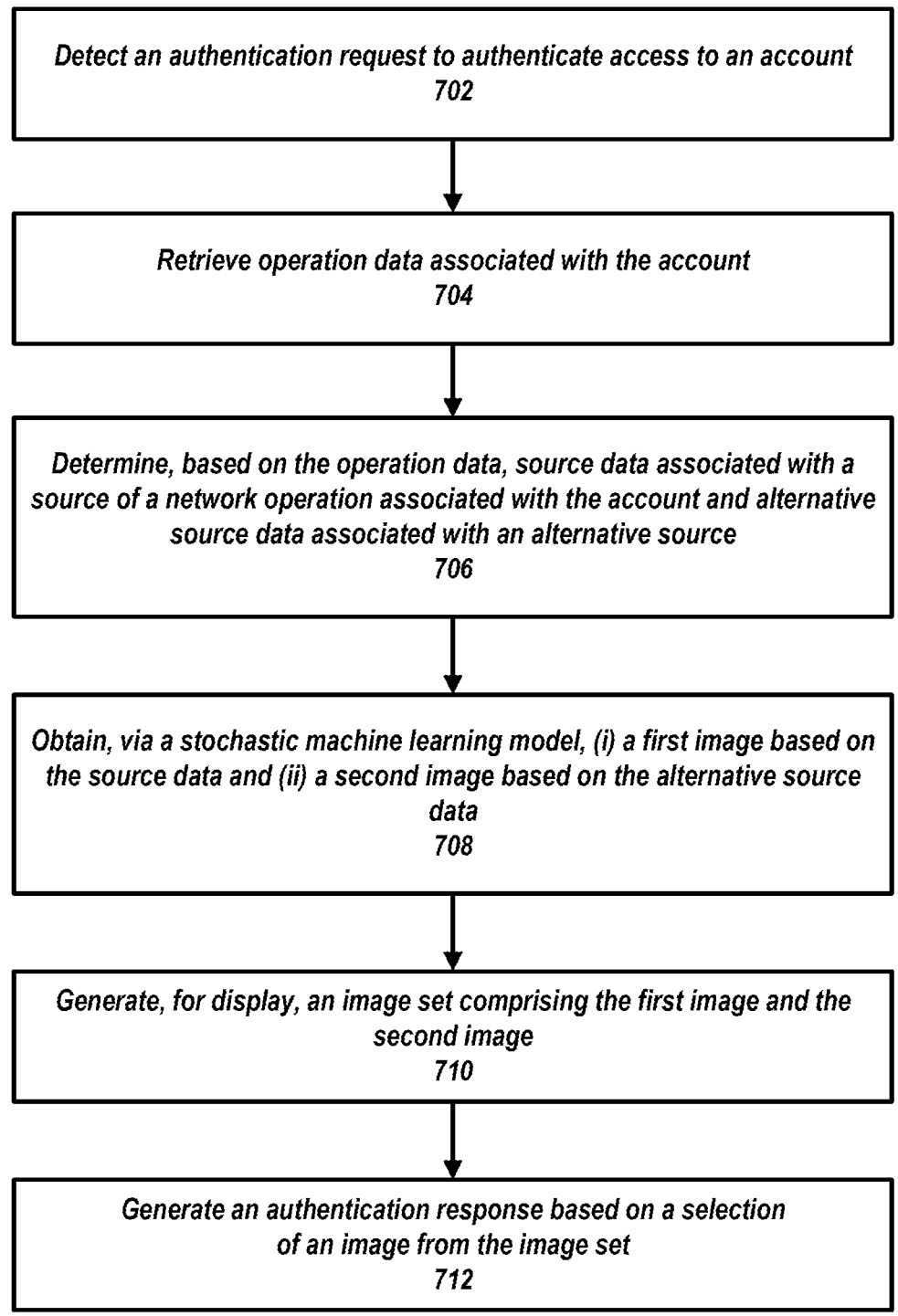
FIG. 7 shows a flowchart of the process for facilitating authentication using stochastic-model-derived images, in accordance with one or more embodiments.

FIG. 7 shows a flowchart of the process 700 for facilitating authentication using stochastic-model-derived images, in accordance with one or more embodiments. For example, the system may use process 700 (e.g., as implemented on one or more system components described above) to facilitate token use authentication for an access token using stochastic-model-derived images generated using source data relating to a network operation performed using the access token.

At 702, authentication system 102 (e.g., using one or more of processors 610*a*-610*n*) may detect an authentication request to authenticate access to an account. The authentication request may include an account identifier associated with the account. In some embodiments, the authentication request may originate from a particular source, and the authentication request may include data about the source. Authentication system 102 may detect the authentication request using one or more of I/O device interface 630 or I/O device 660.

At 704, authentication system 102 (e.g., using one or more of processors 610*a*-610*n*) may retrieve operation data associated with the account. For example, authentication system 102 may retrieve the operation data using the account identifier. The operation data may include records of account access granted or declined, including details of each occurrence of granted or declined access. For example, the operation data may include a log of previous authentication requests, sources associated with the previous authentication requests, data associated with the previous authentication requests, and information about each request being granted or declined. In some embodiments, authentication system 102 may retrieve the operation data using one or more of system memory 620, data 680, or the network.

At 706, authentication system 102 (e.g., using one or more of processors 610*a*-610*n*) may determine, based on the operation data, source data associated with a source of a network operation associated with the account and alternative source data associated with an alternative source. For example, based on the operation data, authentication system 102 may determine a source associated with an operation included in the operation data. Authentication system 102 may determine a source associated with an occurrence of granted or denied access associated with the account. The source may be a browser, a device, an API client, or other source. Authentication system 102 may retrieve source data associated with the identified source. In some embodiments, authentication system 102 may determine, based on the operation data, an alternative source different from the source. In some embodiments, the alternative source may be associated with a variation of the source, the alternative source may be related to the source, or the alternative source may be otherwise associated with the source. For example, the alternative source may be a related browser, a related device, a related API client, or another related source. In some embodiments, the alternative source may be unrelated to the source. In some embodiments, the alternative source may be related to a different operation from the operation data. In some embodiments, authentication system 102 may determine the source data and the alternative source data using one or more of processors 610*a*-610*n*.

At 708, authentication system 102 (e.g., using one or more of processors 610*a*-610*n*) may obtain, via a stochastic machine learning model, (i) a first image based on the source data and (ii) a second image based on the alternative source data. In some embodiments, using source data associated with the source and alternative source associated with the alternative source, authentication system 102 may generate first and second image generation parameters, respectively. For example, the image generation parameters may include the source data and alternative source data, constraints for the generated images, or other parameters. In some embodiments, authentication system 102 may provide the first and second image generation parameters to the stochastic machine learning model to cause the stochastic machine learning model to generate the first and second stochastic images, respectively. The first and second stochastic images may respectively represent, illustrate, or otherwise relate to the source and alternative source. In some embodiments, authentication system 102 may obtain the first and second images via the stochastic machine learning model using one or more of processors 610*a*-610*n*.

At 710, authentication system 102 (e.g., using one or more of processors 610*a*-610*n*) may generate, for display, an image set including the first image and the second image. For example, authentication system 102 may display the first and second stochastic images to a user, along with instructions to select an image associated with the source of the operation. In some embodiments, authentication system 102 may generate the image set for display using one or more of I/O device interface 630 or I/O device 660.

At 712, authentication system 102 (e.g., using one or more of processors 610*a*-610*n*) may generate an authentication response based on a selection of an image from the image set. In some embodiments, authentication system 102 may receive a selection of the first image from the image set and may grant the authentication request based on the selection of the first image. In some embodiments, authentication system 102 may receive a selection of the second image from the image set and may decline the authentication request based on the selection of the second image. In some embodiments, authentication system 102 may generate the authentication response using one or more of processors 610a-610n.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising detecting an authentication request to authenticate access to an account, the authentication request comprising an account identifier associated with the account, retrieving, using the account identifier, operation data associated with the account, determining, based on the operation data, source data associated with a source of a network operation associated with the account and alternative source data associated with an alternative source, wherein the alternative source is different from the source, obtaining, via one or more stochastic machine learning models, (i) a first image based on the source data or (ii) a second image based on the alternative source data, generating, for display, an image set comprising the first image or the second image, receiving a selection of an image from the image set, and granting the authentication request based on the selection of the image.
2. The method of any one of the preceding embodiments, further comprising retrieving the first image or the second image from a database using the source data or the alternative source data, respectively.
3. The method of any one of the preceding embodiments, further comprising processing the first image or the second image using one or more image processing techniques.
4. The method of any one of the preceding embodiments, further comprising generating, for display with the image set, instructions to select the image associated with the source of the network operation.
5. The method of any one of the preceding embodiments, further comprising declining the authentication request based on a different selection, from the image set, of a different image than the image.
6. The method of any one of the preceding embodiments, wherein obtaining the first image or the second image via the stochastic machine learning model comprises generating, for input to the stochastic machine learning model, first image generation parameters using the source data associated with the source or second image generation parameters using the alternative source data associated with the alternative source, and providing, to the stochastic machine learning model, (i) the first image generation parameters to obtain the first image or (ii) the second image generation parameters to obtain the second image.
7. The method of any one of the preceding embodiments, wherein the first image generation parameters comprise one or more first constraints for the first image or the second image generation parameters comprise one or more second constraints for the second image.
8. The method of any one of the preceding embodiments, further comprising determining, based on the operation data, a time associated with the source, and determining the one or more first constraints based on the time associated with the source.
9. The method of any one of the preceding embodiments, further comprising determining, based on the operation data, a location associated with the source, and determining the one or more first constraints based on the location associated with the source.
10. The method of any one of the preceding embodiments, further comprising determining, based on the operation data, a weather characteristic associated with the source, and determining the one or more first constraints based on the weather characteristic associated with the source.
11. The method of any one of the preceding embodiments, wherein the source differs from the alternative source according to one or more of a time, a location, or a weather characteristic.
12. The method of any one of the preceding embodiments, wherein obtaining the first image comprises causing a generator of the stochastic machine learning model to generate the first image based on the source data.
13. The method of any one of the preceding embodiments, wherein obtaining the second image comprises causing a generator of the stochastic machine learning model to generate the second image based on the alternative source data.
14. One or more non-transitory, machine-readable media storing instructions that, when executed by one or more data processing apparatuses, cause operations comprising those of any of embodiments 1-13.
15. A system comprising one or more processors and memory storing instructions that, when executed by the processors, cause the processors to effectuate operations comprising those of any of embodiments 1-13.
16. A system comprising means for performing any of embodiments 1-13.
17. A system comprising cloud-based circuitry for performing any of embodiments 1-13.

What is claimed is:

1. A system for facilitating token use authentication for an access token using stochastic-model-derived images generated using source data relating to a network operation performed using the access token, the system comprising:

one or more processors and one or more non-transitory, computer-readable media having computer-executable instructions stored thereon, the computer-executable instructions, when executed by the one or more processors, causing operations comprising:
  detecting an authentication request to authenticate use of a network access token, the authentication request comprising a token identifier associated with the network access token;
  in response to detecting the authentication request, retrieving, using the token identifier, operation data associated with the network access token;
  determining, based on the operation data, source data associated with a source of a network operation and alternative source data associated with an alternative source, wherein the alternative source is different from the source;
  generating, for input to a stochastic machine learning model, first image generation parameters using the source data associated with the source and second image generation parameters using the alternative source data associated with the alternative source;
  providing, to the stochastic machine learning model, (i) the first image generation parameters to obtain a first stochastic image for the network operation and (ii) the second image generation parameters to obtain a second stochastic image for the network operation;
  generating, for display, (i) an authentication image set comprising the first stochastic image and the second stochastic image and (ii) instructions to select an image associated with the source of the network operation; and
  in response to a user image selection from the authentication image set, generating an authentication response to the authentication request such that the authentication response comprises (i) granting the authentication request in response to a first user selection of the first stochastic image and (ii) declining the authentication request in response to a second user selection of the second stochastic image.

2. A method comprising:
detecting an authentication request to authenticate use of an access token, the authentication request comprising a token identifier associated with the access token;
retrieving, using the token identifier, operation data associated with the access token;
determining, based on the operation data, source data associated with a source of a network operation and alternative source data associated with an alternative source, wherein the alternative source is different from the source;
providing, to a stochastic machine learning model, (i) the source data to obtain a first image for the network operation and (ii) the alternative source data to obtain a second image for the network operation;
generating, for display, an image set comprising the first image and the second image;
receiving a selection of the first image from the image set; and
granting the authentication request based on the selection of the first image.

3. The method of claim 2, further comprising generating, for display with the image set, instructions to select an image associated with the source of the network operation.

4. The method of claim 2, further comprising declining the authentication request based on the selection of the second image.

5. The method of claim 2, wherein providing the source data and the alternative source data to the stochastic machine learning model comprises:
  generating, for input to the stochastic machine learning model, first image generation parameters using the source data associated with the source and second image generation parameters using the alternative source data associated with the alternative source; and
  providing, to the stochastic machine learning model, (i) the first image generation parameters to obtain the first image and (ii) the second image generation parameters to obtain the second image.

6. The method of claim 5, wherein the first image generation parameters comprise one or more first constraints for the first image and the second image generation parameters comprise one or more second constraints for the second image.

7. The method of claim 6, further comprising:
  determining, based on the operation data, a time associated with the source; and
  determining the one or more first constraints based on the time associated with the source.

8. The method of claim 6, further comprising:
  determining, based on the operation data, a location associated with the source; and
  determining the one or more first constraints based on the location associated with the source.

9. The method of claim 6, further comprising:
  determining, based on the operation data, a weather characteristic associated with the source; and
  determining the one or more first constraints based on the weather characteristic associated with the source.

10. The method of claim 2, wherein the source differs from the alternative source according to one or more of a time, a location, or a weather characteristic.

11. The method of claim 2, wherein obtaining the second image comprises causing a generator of the stochastic machine learning model to generate the second image based on the alternative source data.

12. One or more non-transitory, computer-readable media storing instructions that, when executed by one or more processors, cause operations comprising:
detecting an authentication request to authenticate access to an account, the authentication request comprising an account identifier associated with the account;
retrieving, using the account identifier, operation data associated with the account;
determining, based on the operation data, source data associated with a source of a network operation associated with the account and alternative source data associated with an alternative source, wherein the alternative source is different from the source;
obtaining, via one or more stochastic machine learning models, (i) a first image based on the source data and (ii) a second image based on the alternative source data;
generating, for display, an image set comprising the first image and the second image;
receiving a selection of the first image from the image set; and
granting the authentication request based on the selection of the first image.

13. The one or more non-transitory, computer-readable media of claim 12, wherein the instructions further cause the one or more processors to perform operations comprising generating, for display with the image set, instructions to select an image associated with the source of the network operation.

14. The one or more non-transitory, computer-readable media of claim 12, wherein the instructions further cause the one or more processors to perform operations comprising declining the authentication request based on the selection of the second image.

15. The one or more non-transitory, computer-readable media of claim 12, wherein, to obtain, via the one or more stochastic machine learning models, the first image and the second image, the instructions further cause the one or more processors to perform operations comprising:

generating, for input to the one or more stochastic machine learning models, first image generation parameters using the source data associated with the source and second image generation parameters using the alternative source data associated with the alternative source; and providing, to the one or more stochastic machine learning models, (i) the first image generation parameters to obtain the first image and (ii) the second image generation parameters to obtain the second image.

16. The one or more non-transitory, computer-readable media of claim 15, wherein the first image generation parameters comprise one or more first constraints for the first image and the second image generation parameters comprise one or more second constraints for the second image.

17. The one or more non-transitory, computer-readable media of claim 16, wherein the instructions further cause the one or more processors to perform operations comprising:

determining, based on the operation data, a time associated with the source; and determining the one or more first constraints based on the time associated with the source.

18. The one or more non-transitory, computer-readable media of claim 16, wherein the instructions further cause the one or more processors to perform operations comprising:

determining, based on the operation data, a location associated with the source; and determining the one or more first constraints based on the location associated with the source.

19. The one or more non-transitory, computer-readable media of claim 16, wherein the instructions further cause the one or more processors to perform operations comprising:

determining, based on the operation data, a weather characteristic associated with the source; and determining the one or more first constraints based on the weather characteristic associated with the source.

20. The one or more non-transitory, computer-readable media of claim 12, wherein, to obtain the second image, the instructions further cause the one or more processors to perform operations comprising causing a generator of the one or more stochastic machine learning models to generate the second image based on the alternative source data.

* * * * *